United States Patent [19]

Hopkins et al.

[11] Patent Number: 5,373,357
[45] Date of Patent: Dec. 13, 1994

[54] HEADLIGHT AIMING METHOD USING PATTERN FRAMING

[75] Inventors: Evan L. Hopkins; Gregory A. Yotz, both of Emporia, Kans.

[73] Assignee: Hopkins Manufacturing Corporation, Emporia, Kans.

[21] Appl. No.: 964,599

[22] Filed: Oct. 21, 1992

Related U.S. Application Data

[63] Continuation-in-part of Ser. No. 652,940, Feb. 8, 1991, Pat. No. 5,164,785.

[51] Int. Cl.$^5$ ............................................. G01J 1/00
[52] U.S. Cl. ..................................................... 356/121
[58] Field of Search ............... 356/121, 122, 123, 153, 356/154, 394; 33/288, 335; 382/8, 22, 65; 358/101, 106, 107

[56] References Cited

U.S. PATENT DOCUMENTS

| | | |
|---|---|---|
| 2,162,010 | 6/1939 | Graham . |
| 3,077,139 | 2/1963 | Todd et al. . |
| 3,386,333 | 6/1968 | Preston . |
| 3,467,473 | 9/1969 | Preston . |
| 3,515,483 | 6/1970 | Irwin . |
| 3,532,432 | 10/1970 | Mansour . |
| 3,709,609 | 1/1973 | Spengler et al. . |
| 3,746,449 | 7/1973 | Schick . |
| 3,791,740 | 2/1974 | Proefrock . |
| 4,120,589 | 10/1978 | Mima ................................ 356/121 |
| 4,185,298 | 1/1980 | Billet et al. ...................... 358/106 |
| 4,435,078 | 3/1984 | de Brabander et al. . |
| 4,609,939 | 9/1986 | Kozawa et al. . |
| 4,647,195 | 3/1987 | Ishikawa et al. . |
| 4,679,935 | 7/1987 | Fukuda et al. . |
| 4,730,923 | 3/1988 | Kosugi et al. ................... 356/121 |
| 4,744,655 | 5/1988 | Soika . |
| 4,948,249 | 8/1990 | Hopkins et al. . |
| 4,973,155 | 11/1990 | Masuda . |
| 5,078,490 | 1/1992 | Oldweiler ........................ 356/121 |
| 5,164,785 | 11/1992 | Hopkins ........................... 356/121 |
| 5,170,220 | 12/1992 | Matsumoto et al. ............ 356/121 |

FOREIGN PATENT DOCUMENTS

| | | |
|---|---|---|
| 57-59125A | 4/1982 | Japan . |
| 57-116235A | 7/1982 | Japan . |

*Primary Examiner*—Davis L. Willis
*Assistant Examiner*—Hoa Q. Pham
*Attorney, Agent, or Firm*—Hovey, Williams, Timmons & Collins

[57] ABSTRACT

A method for aiming vehicle headlights and for visually displaying the illumination patterns of the headlights using "pattern framing". The apparatus focuses the light beam on a screen and senses the intensity of the light in each cell of a matrix of cells overlying the reflected light beam with an image sensor. The apparatus generates an electrical signal for each cell indicative of the intensity of the light beam in each cell. The apparatus includes a computer for comparing at least some of the electrical signals to each other and with established criteria to determine whether the headlight is aimed within a prescribed degree of accuracy. The matrix is searched to find a row and column of points farthest away from the "hot spot" of the beam which have at least one point with a certain light intensity relationship. The row and column are compared with the established criteria to determine if the headlight is properly aimed. The apparatus describes the illumination pattern of a headlight by visually displaying at least some of the electrical signals, i.e., the light intensities and their locations, on a display. The illumination pattern can be displayed as a series of isocandela lines, or can be displayed as a simulated headlight illumination pattern on a simulated road surface. The headlight illumination pattern can be compared to a properly aimed, simulated headlight illumination pattern to indicate the necessary aiming correction.

17 Claims, 8 Drawing Sheets

HEADLIGHT AIMING METHOD USING PATTERN FRAMING

The present invention is a continuation-in-part application of U.S. patent application Ser. No. 07/652,940, filed Feb. 8, 1991 now U.S. Pat. No. 5,164,785, for "Headlight Aiming Apparatus and Display". Specifically, the present invention relates to an improved method which uses "pattern framing" for accurately aiming vehicle headlights in the course of vehicle manufacture or after the vehicle has been in use.

BACKGROUND

Vehicle headlights are designed to project high intensity beams of light in prescribed patterns to illuminate certain portions of the road in front of the vehicle. Generally, vehicles are equipped with a first pair of headlights for projecting so-called high beams of light to illuminate the highway in front of the vehicle. A second pair of headlights projects so-called low beams of light that are directed downwardly and to the right of the high beam so as not to blind an oncoming motorist. In some vehicles, high and low beam patterns are projected from the same lamps using different filaments.

In order to produce a desired illumination that maximizes visibility at night without producing excessive glare for oncoming motorists, the headlights must be properly aimed and produce a particular light pattern. Standards for headlight aiming and illumination patterns are prescribed by industrial groups, such as the Society of Automotive Engineers (SAE), and by governmental agencies. In general, different aiming and illumination pattern standards have been prescribed for different geographical areas, such as North America and Europe.

Methods for determining proper vehicle headlight aiming during vehicle manufacture and after vehicles have been in use are known. Two examples of known methods are described in U.S. Pat. No. 3,515,483 to Irwin and U.S. Pat. No. 4,435,078 to de Brabander et al. Irwin '483 and de Brabander '078 use a lens to focus a headlight light beam within a compact electro-optical unit. A number of discrete light intensity sensors are disposed within the optical system for sensing the intensity of light at a relatively small number of positions in the light beam.

In Irwin '483, which is owned by the assignee of the present invention, the intensities of light detected by each of nine discrete light intensity sensors are compared in selected pairs to determine whether established aiming criteria are satisfied within a prescribed degree of accuracy. If the accuracy is not achieved, the position of the headlight is adjusted to achieve the proper aim. This method of comparing the relative intensities of different portions of the light pattern is referred to as the fractional balance method.

In de Brabander '078, a variation of the fractional balance aiming technique is employed. There, light intensities measured at about the same number of discrete points by discrete light intensity sensors are used directly in comparison tests, or are multiplied by fractional constants to determine whether a headlight is accurately aimed or not.

The fractional balance method for headlight aiming is also described in Hopkins, et al, U.S. Pat. No. 4,948,249, which is also owned by the assignee of the present invention. In Hopkins '249, the light beam of a headlight is projected on a reflective surface or screen and includes an image sensor for sensing the light intensity in each cell of a continuous matrix of cells that overlies the reflected light beam. The image sensor produces an electrical signal, either in digital or analog form, for each cell. The signal indicates the cell location and the light intensity in that cell. Analog signals, such as are produced by a charge coupled device, are preferably digitized. The digital signals, i.e. pixels, may be manipulated by a computer to determine headlight aiming accuracy using the fractional balance method, to correct inaccurate aiming, and to describe the illumination pattern of the headlight.

Another known method for aiming vehicle headlights is commonly referred to as "hot spot aiming". Hot spot aiming detects the location of the brightest location on the headlight intensity pattern (i.e., the "hot spot"), and compares the location of the hot spot with appropriate specifications to determine if the headlight is properly aimed.

The above-described methods also provide a display of the headlight light intensity pattern as part of the aiming process. For example, Hopkins '249 displays the light intensity pattern of the headlight as a series of isocandela lines superimposed on a graphical display of an x-y axis. Alternatively, the light intensity pattern can be displayed as a simulated light beam on a simulated road surface, such as shown in Hopkins, U.S. Pat. No. 5,164,785, which is also owned by the assignee of the present invention. Hopkins '785 also discloses to alternatively display the intensity pattern of the actual headlight with the intensity pattern of a properly aimed headlight having the specifications of either the manufacturer or the regulating governmental agency.

While the above-described methods provide accurate aiming of most vehicle headlights, certain vehicle headlights currently commercially available, and some of those under development, have illumination patterns which cannot be properly aimed by one (or more) of these known methods. For example, Hopkins '249 and Hopkins '785 require certain geometrical and spacial relationships to exist in the headlight illumination pattern for proper aiming. In particular, one of the points must lie on the horizontal axis 10.5 inches to the right from the intersection of orthogonal horizontal and vertical axes and have an intensity equal to 20% of the maximum low beam intensity. The other point must lie on the vertical axis 5 inches below the intersection of the horizontal and vertical axes and have an intensity of 30% of the maximum low beam intensity. However, not all headlights have illumination patterns which have these particular geometrical and spacial criteria.

Accordingly, there is a demand in the industry for an improved headlight aiming method which provides accurate and rapid results, regardless of the type of headlight being tested.

SUMMARY OF THE INVENTION

The present invention provides an improved method for accurately and rapidly aiming vehicle headlights using "pattern framing" so that a wide variety of vehicle headlight types can be aimed. The light beam of a headlight is initially focused on a reflective surface or screen, and an image sensor (e.g., a charge coupled device (CCD)) senses the light intensity in each cell of a continuous matrix of cells that overlies the reflected light beam. The image sensor produces an electrical signal in analog form for each cell. The signal indicates the cell location and the light intensity in that cell. The analog signals, i.e. pixels, may be digitized and then manipulated by a computer to determine headlight aiming accuracy, to correct inaccurate aiming, and to describe the illumination pattern of the headlight.

The computer is preferably a microprocessor programmed with software for applying recognized industrial or governmental standards to tests of headlight aiming and intensity patterns. Different or changed standards can readily be accommodated by adding or changing software in the computer without any mechanical change in the apparatus. Measurements of headlight aiming accuracy can be used to produce error signals indicative of the amount and direction of aiming error. The error signals may be displayed as an indication of relative displacement from the proper aim of the headlight to allow for manual aiming of the headlight, or can be used to mechanically aim the headlight by using powered screwdrivers.

Preferably the apparatus includes a probe for initially orienting a lens or focusing aperture relative to the headlight. The probe is pivotally connected to the housing of the lens or aperture and can be moved away from the lens or aperture after orientation of the headlight.

In the improved aiming method, a "pattern framing" technique is used to test the low beams of the vehicle headlights. According to this method, the matrix of pixels is searched to locate the cell having the greatest light intensity value (i.e., the "hot spot"), and also to locate the horizontal row and vertical column of cells above and to the left of the hot spot (for a right-hand drive vehicle), or above and to the right of the hot spot (for a left-hand drive vehicle), having prescribed light intensity relationships with respect to the hot spot. Preferably, the cells are searched to find a horizontal row which is farthest away from the hot spot and which has at least one cell having a light intensity value of 20% of the maximum light intensity; and a vertical row which is farthest away from the hot spot and which has at least one cell with a light intensity value of 60% of the maximum light intensity. Orthogonal axes are drawn through the row and column, when located. The intersection of the axes is compared to a vehicle-specific mechanical axis to determine the accuracy of the aim. High beams are tested by separately balancing light intensities on opposite sides of a pair of orthogonal axes using other methods. Each axis is located to achieve the best balance of total light intensities on opposite sides of the axis. The intersection of the axes is calculated and compared to a vehicle-specific mechanical axes to determine aim accuracy.

According to a further aspect of the present invention, the computer allows manual selection of the type of headlight aiming method employed for a particular headlight. This allows an operator to select a particular headlight aiming method (e.g., "pattern framing", "fractional balance" or "hot spot aiming"), should one method not properly aim the headlight or should the operator consider one method to be more appropriate for a particular headlight.

By displaying at least some of the pixels, i.e., light intensity versus location, the illumination pattern can be visually described either as a graphical display of an intensity pattern, or as a simulated light beam. For example, the intensity pattern may be described by a graphical display on a printer or a CRT. Isocandela contours may be easily plotted to illustrate the intensity pattern. Alternatively, a simulated light beam can be displayed on the CRT which illuminates an appropriate portion of a simulated road surface. The simulated light beam can be compared with the illumination of a properly oriented, simulated light beam to indicate the necessary aiming corrections.

In any case, the improved aiming method can be used with a wide variety of headlight types to provide accurate and rapid results.

It is therefore a basic object of the present invention to provide a vehicle headlight aiming method that properly aims a wide variety of vehicle headlight types with respect to applicable specification(s).

It is another object of the present invention to provide a headlight aiming device which allows manual selection of the type of aiming method employed for a particular headlight.

Further objects of the present invention will become apparent from the following detailed description and the accompanying drawings.

DETAILED DESCRIPTION

Figure 1:
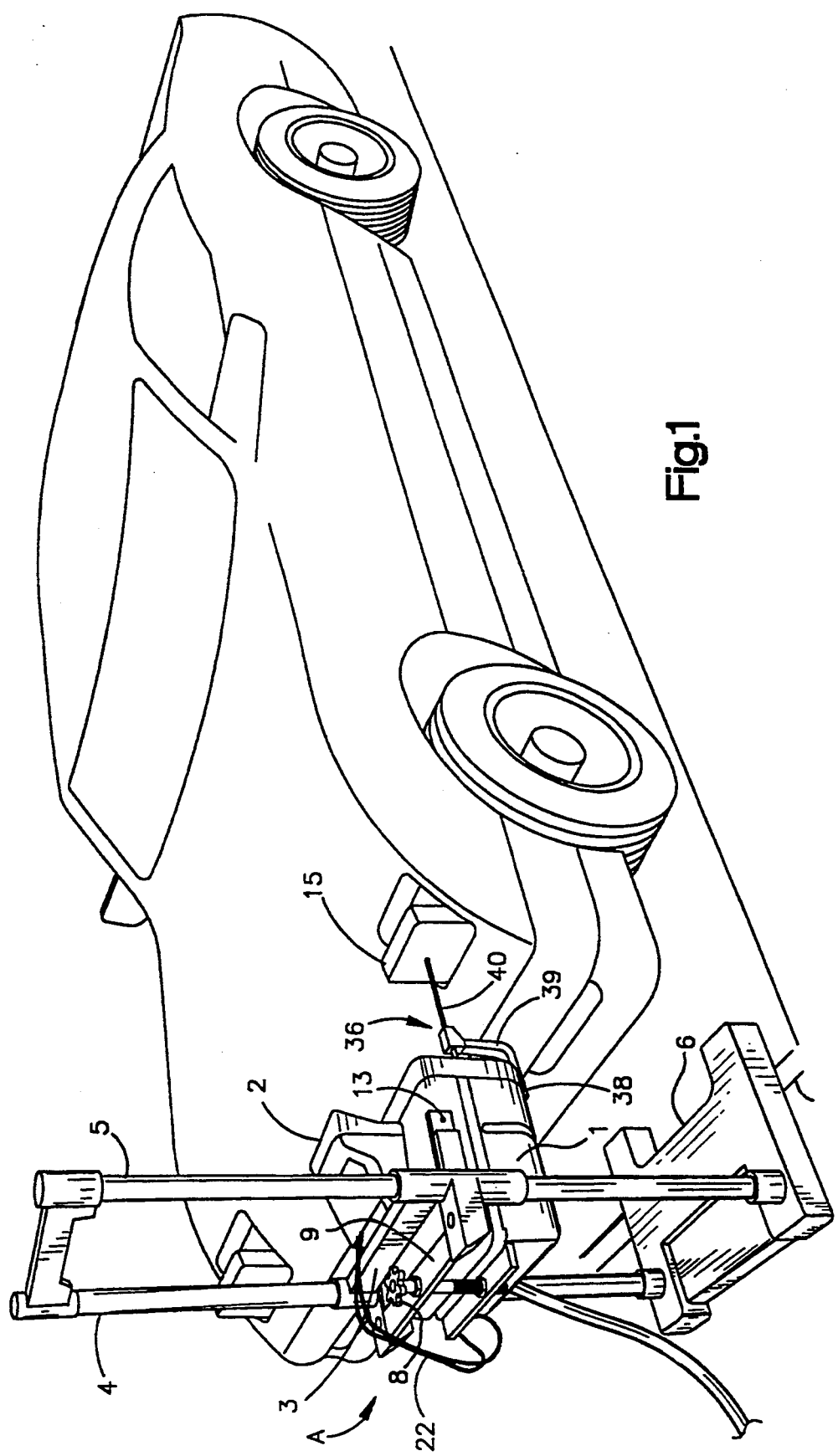
FIG. 1 is a perspective view of an apparatus according to the invention illustrating the method of aiming a vehicle headlight.
Figure 2:
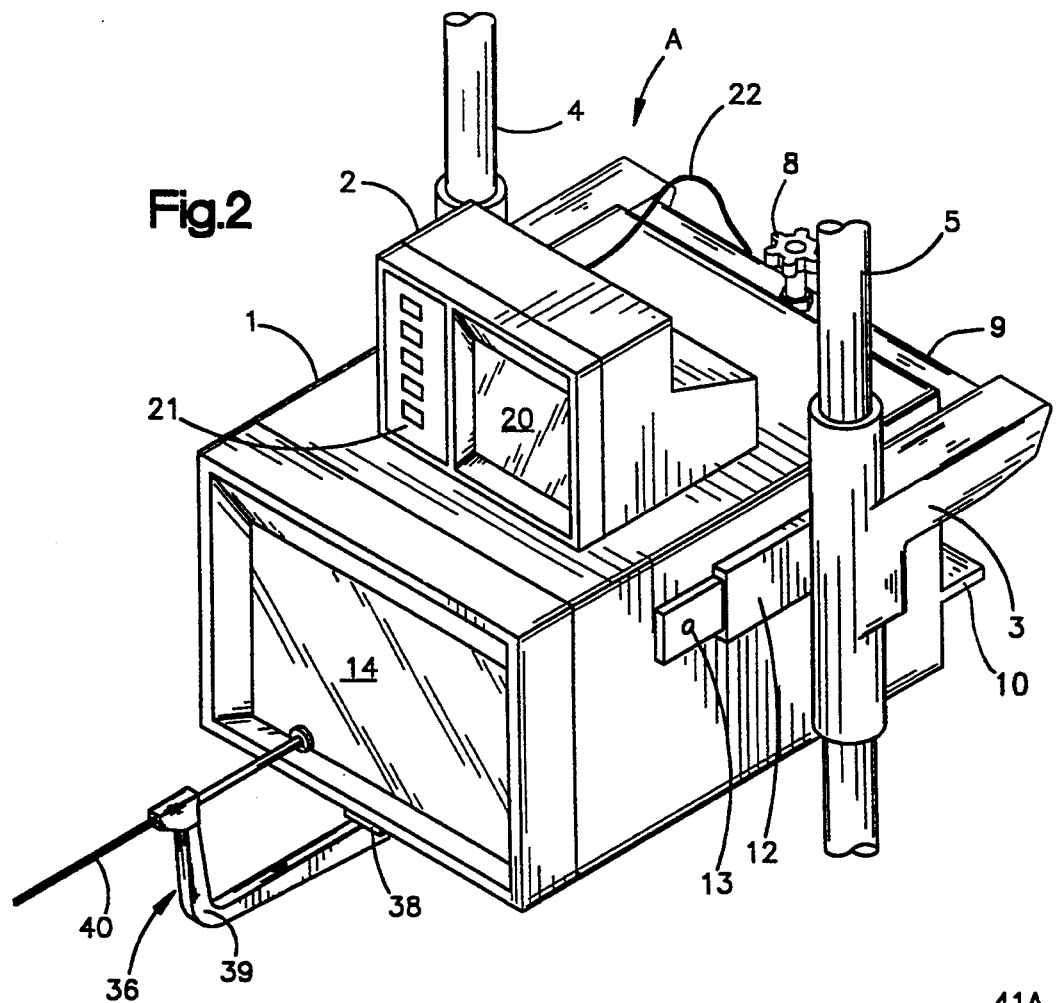
FIG. 2 is a close-up perspective view of a headlight aiming housing and a computer and CRT housing cooperatively mounted on a stand.

FIGS. 1 and 2 illustrate a perspective view of one aspect of the headlight aiming device "A" used in conjunction with a typical vehicle. The headlight aiming device includes two housings 1 and 2, commonly mounted on a support bracket 3. Support bracket 3 is slidingly received on two generally vertical posts 4 and 5. Posts 4 and 5 extend upwardly from a base 6. The base 6 can move transverse to the orientation of posts 4 and 5 on a track 7, such as is shown in Irwin, U.S. Pat. No. 3,515,483. That patent is incorporated herein by reference.

Although not shown, the base 6 can also include means of adjusting the attitude of housing 1. This angular compensation may be necessary to eliminate the effects of any deviation from a true horizontal position of a floor supporting a vehicle containing headlights to be aimed. Angular errors in the floor can produce errors in the aiming if not taken into account.

Alternatively or additionally, the support bracket 3 can include the means of adjusting the attitude of housing 1 along at least one axis. To this end, a knob 8 having a threaded shaft can extend through a flange 9 of support bracket 3 extending across the rear of housing 1, and through a flange 10 attached to the rear of housing 1 and extending outwardly therefrom. The support bracket 3 includes arms 12 which extend outwardly therefrom to support opposite sides of housing 1. Housing 1 can be pivotally mounted to arms 12 by pivot pins 13. Rotation of the knob 8 affects vertical upward and downward pivotal movement of the rear of housing 1 about pivot pins 13, and thus results in angular movement of the housing with respect to support bracket 3 along an axis perpendicular to the orientation of the housing. Appropriate level bubbles can be provided in or on the housing to provide a visual indication of the attitude of the housing.

Further, angular compensation may be provided by entering the deviation directly into the computer. In this case, the deviation can be calculated using a "split image transit" available from the assignee of the present invention, or any other appropriate device, to determine the angle of the floor slope. This value can then by input to the computer to provide necessary compensation.

Figure 3:
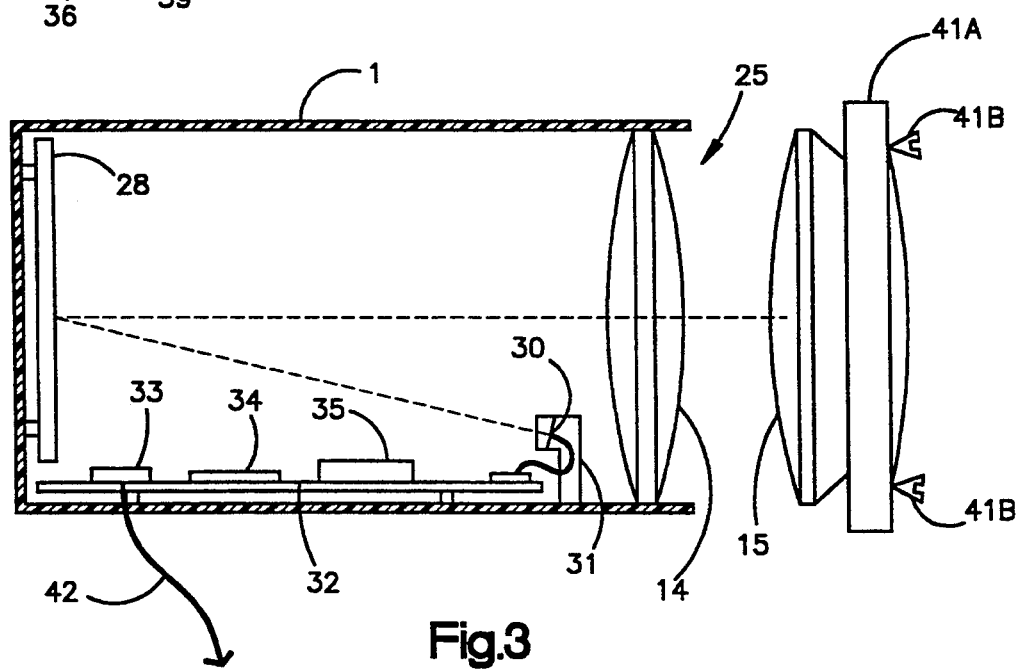
FIG. 3 is a side view, partially in section, of the headlight aiming housing and a headlight.

Referring now to FIGS. 1 and 3, housing 1 includes a lens 14 at its front end for focusing a light beam of a vehicle headlight 15 within housing 1, as described herein in more detail. Lens 14 is positioned opposite headlight 15 by vertically or horizontally adjusting housing 1 as necessary and by moving base 5. Housing 1 includes other optical and electronic components as explained in connection with FIG. 3. Like elements in all of the figures are given similar reference numerals with the understanding that the drawing figures are merely illustrative of some embodiments of the invention.

Figure 6:
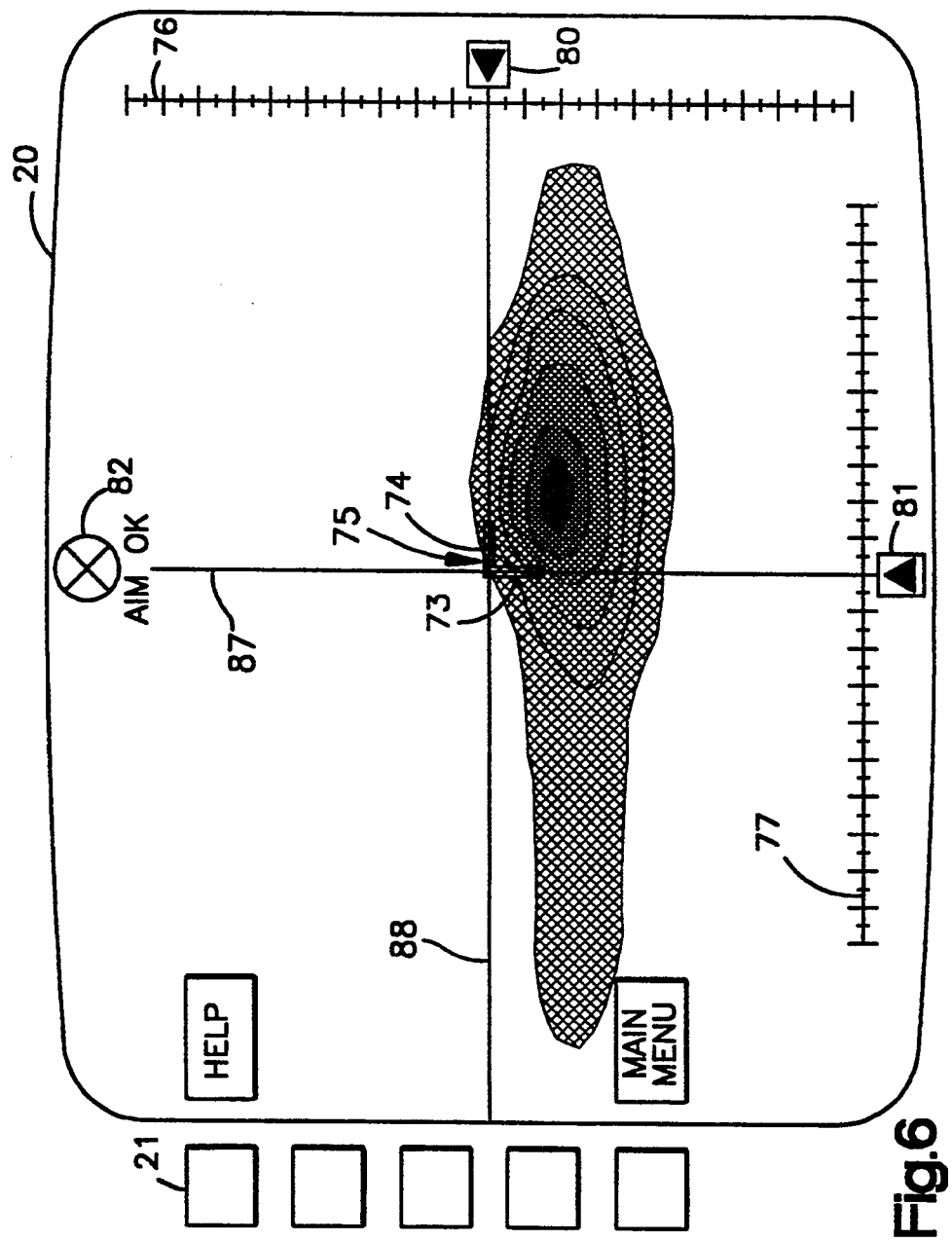
FIG. 6 is a graphical display on a CRT of an intensity pattern of a vehicle headlight produced according to the invention, illustrating a properly aimed vehicle headlight.

Housing 2 is supported by and mounted to housing 1. Housing 2 includes a CRT display 20 for displaying instructions, intensity patterns, error messages, etc. Adjacent CRT 20 in housing 2 is keyboard 21 which permits an operator to control the functioning of the apparatus, so that the headlights can be appropriately aimed and intensity patterns displayed. Indicia on the individual keys of keyboard 21 can be replicated on CRT display 20, for example, as shown in FIG. 6.

Referring again to FIG. 1, a computer that controls the functioning of the components of the aiming device is mounted in housing 1. Housing 1 and housing 2 are connected by a multiple conductor electrical cable 22. The components within housing 1 and 2 and their interaction with each other can be better understood by reference to FIGS. 3 and 4.

In FIG. 3, housing 1 has an open end, indicated generally at 25, in which lens 14 is mounted. Lens 14 is a converging lens that focuses a beam of light from vehicle headlight 15 onto a surface or screen 28 mounted within housing 1 opposite lens 14. Lens 14 is shown as a double convex converging lens, however a Fresnel lens can also be used in the apparatus. Lens 14 is relatively large so that it may capture nearly all of the light from headlight 15. Preferably lens 14 is larger in area than headlight 15 and may be made of glass or any transparent material.

SAE headlight aiming and headlight pattern tests recommend test conditions in which the headlight beam is imaged on a surface spaced 25 feet from the headlight. Such a distant focusing surface requires an inordinate amount of space both in vehicle assembly operations and in vehicle service facilities. The focal length of lens 14 is chosen so that an image comparable to what would be formed 25 feet from headlight 15 is formed in a smaller size on screen 28. Nevertheless, lens 14 and screen 28 need only be separated by a relatively short distance, for example only a few feet, so that considerable space is saved. Because of compression of the image size and the sensing of its intensity in many cells within the image as described below, it is important that lens 9 introduce little distortion into the light beam.

The image formed on screen 28 is sensed by an image sensor 30 that is located within housing 1. Image sensor 30 includes a relatively large number of charged cells arranged in a matrix. The matrix of cells permits the intensity of the light beam to be measured across the width of the beam. For example, image sensor 30 could be a charge coupled device (CCD) integrated circuit (IC) such as commercially available from Texas Instruments, model no. TC211.

A typical, commercially available CCD IC includes an integrated cell matrix and cell output circuitry. The CCD IC is mounted in an optical assembly such as a pin hole camera 31 and is in electrical communication with an Analog-to-Digital converter and a microprocessor. The TC211 unit senses the intensity of a light beam incident on the IC, and stores that information, i.e. pixels. The memory elements include information relative to the proportion of light incident in every cell in the matrix of cells. The cells can be interrogated in a sequential fashion and can provide light intensity values in an analog format which may then be digitized.

The pin hole camera 31 of image sensor 30 is mounted on housing 1 and is electrically connected to circuit board 32. Circuit board 32 displays aim data and beam images through monitor and power port 33. Calibration to the system is provided through calibrate port 34. Software updates can be provided through expansion port 35.

As is apparent from FIG. 3, it is important to center headlight 15 relative to lens 14, or a focusing aperture if no lens is used, to form the proper image for headlight aiming and intensity pattern measurements. To this end, as shown in FIGS. 1 and 2, proper alignment may be achieved with the aid of an aiming probe, indicated generally at 36. Aiming probe 36 is pivotally mounted on pivot pin 38 attached to the bottom of housing 1. Probe 36 can be pivotally moved from a position alongside the housing 1 to a position substantially centered with respect to lens 14. The probe 36 includes an arm 39 pivotally mounted for left-to-right movement on pivot pin 38, and a pointer 40 which is mounted to a slot for upwardly and downwardly movement on arm 39 and extends along the axial centerline of lens 14. The pointer 40 can be oriented with a center mark (not shown) on headlight 15. Housing 1 can be adjusted relative to headlight 15 using track 7 and knob 8 until probe 40 is properly oriented with the headlight center mark.

It is also important to orient the headlight 15 such that the axial centerline of the headlight extends substantially coincident with the centerline of lens 14. To this end, pointer 40 is also axially mounted for telescoping movement on arm 39 and includes indexed graduations along its length. The pointer can be moved axially inward toward and axially outward away from the housing 1 when the pointer is centered with respect to lens 14.

Initially during the aiming process, the aiming device is moved in front of the headlight, and the pointer 40 is moved axially outward until the pointer touches the center point of the headlight 15. The axial position of the pointer with respect to arm 39 is then recorded, and the aiming device is moved transversely along track 7 to a position in front of the other headlight, and the procedure is repeated. Any difference in the axial displacement of the pointer between the two headlights is detected to provide an indication of whether the vehicle is off-center (i e., "skewed") with respect to the aiming device, and hence that the axial centerline of the headlight is not coincident with the centerline of the lens 14. This deviation can be properly compensated for during the aiming process such as by inputting the deviation into the computer.

In FIG. 3, headlight 15 is shown schematically and adjustably mounted in a frame 41A on the front end of a typical vehicle (not shown). The position of headlight 15 within frame 41A is controlled by the relative positions of adjusting screws 41B. While only two adjusting screws are shown, a headlight mounting may have three or more adjusting screws which provide independent adjustment of the vertical and horizontal orientation of headlight 15. To correct the aim of headlight 15 in a particular direction and by a particular amount, an appropriate screw is tightened or untightened to effect the desired aiming correction.

Figure 4:
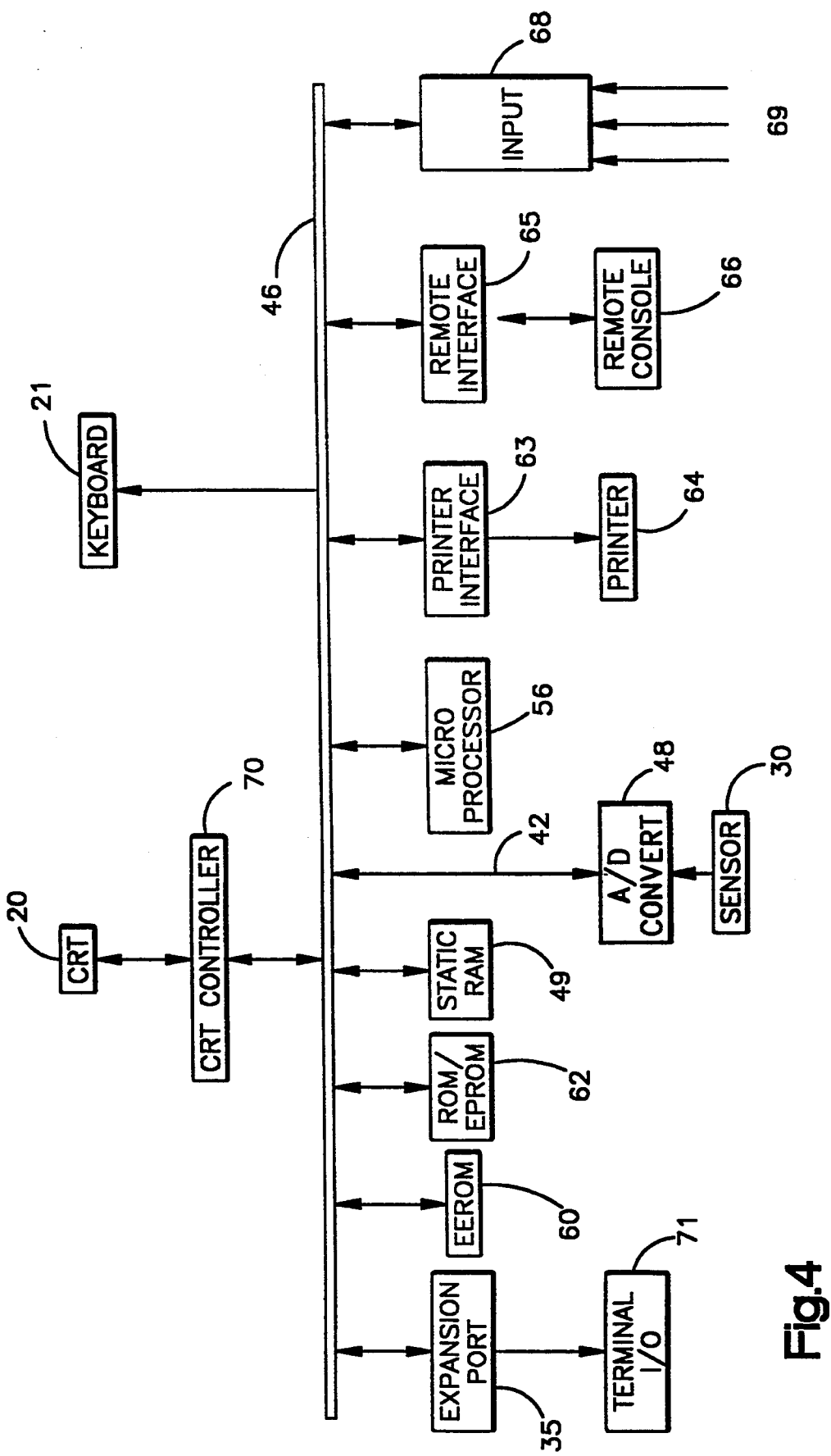
FIG. 4 is a schematic, block diagram of the electronic controls according to the invention.

In FIG. 4, one embodiment of electronic controls for the headlight aiming apparatus and method is schematically shown. Input and output information and control signal interconnections are indicated with identical reference numerals in FIGS. 3 and 4. For example, data on light intensity and position from image sensor 30 is passed along line 42 to the circuitry of FIG. 4.

The circuitry of FIG. 4 is intended to be used with an image sensor like the TC211 that produces signals indicative of the light intensity, and that transfers pixel information of the light intensity to a microprocessor 56. Image sensor 30 is in direct communication with bus 46 through Analog-to-Digital converter 48.

The digital information from Analog-to-Digital converter 48 is passed along a data bus 46 to microprocessor 56. Microprocessor 56 then stores the information in static Random Access Memory (RAM) 49. Static RAM 49 is accessible to determine aim and light intensity patterns. Video images are also stored in static RAM 49. Electronic Eraseable Read-Only-Memory (EEROM) 60 contains the reference mechanical intersection of the headlight corresponding to appropriate specifications. The microprocessor 56 executes a computer program stored in a Read Only Memory/Electrically Programmable Read Only Memory (ROM/EPROM) 62. 128K of memory for ROM/EPROM 62 has proven sufficient for storing the software for operating the novel aiming and light pattern device. Microprocessor 50, EEROM 60, static RAM 49 and ROM/EPROM 69 are in direct communication through data bus 46.

A printer interface 63 is in communication with data bus 46 and can be employed to drive a printer 64 for displaying visual output data. The visual output data may be alphanumeric print-outs, or can be graphical displays as in FIG. 5.

A remote control interface 65 can be included with data bus 46 to drive a remote console 66 so that the aiming device may be controlled at a location remote from the testing location. Preferably, remote interface 65 is a conventional RS232 port. Remote control and monitoring of the apparatus can be particularly useful in vehicle assembly plants. In servicing existing vehicles, an integrated unit like that of FIG. 1 is preferred so that interface 65 and console 66 are likely to be absent.

An input interface 68 in communication with data bus 46 allows various digital inputs 69 to be supplied to the microcomputer.

CRT controller 70 on data bus 46 controls the output of information to the CRT 20. CRT controller 70 includes appropriate RAM for proper functioning of the CRT. Preferably, keyboard 21 and CRT 20 are interactive so that a human operator can initiate operation of the apparatus and generally control its function.

As explained below, under control of the program resident in ROM/EPROM 62, the apparatus can produce an electrical error signal indicating the amount and direction by which a headlight is incorrectly aimed. This error signal can be supplied through bus 46 to CRT controller 70 to CRT 20 to indicate necessary adjustment and/or to external Input/Output 71 for driving external devices such as powered screwdrivers.

The operation of the apparatus and the novel method are best illustrated by specific examples. In the described examples, a CCD IC is employed as image sensor 30 and SAE standards are used as a reference for the determining aiming accuracy and desired beam pattern. The particular software stored in ROM/EPROM 62 controls the particular test standard applied. By modification of the computer program, different standards, such as subsequent modifications to SAE standards, European standards or newly promulgated government standards, can be incorporated into the operation of the apparatus. The stored program can be easily changed, for example by providing additional software in an expansion port 35, or by reprogramming ROM/EPROM 62.

When the equipment is reset or first energized, microprocessor 56 executes diagnostic routines to ensure that the equipment is operating correctly. Thereafter, lens 14 is centered with respect to headlight 15. Centering may be accomplished by pivotally moving probe 36 from a stored position to a centered position with respect to lens 14, and by orienting pointer 39 with respect to the center mark on headlight 15 as discussed previously. Further, angular deviation and skew is determined and compensated for as also described previously—either by mechanical adjustment or by computer input.

Once the headlight has been centered, its aim and/or radiation pattern is tested. In a headlight containing dual filaments and used for both low beam and high beam illumination, only low beam aim is normally checked. In this explanation it is assumed that separate low beam and high beam lamps are employed, and that the low beam and high beam lamps are being tested in that order. The headlight is illuminated so that an image formed on screen 28 reflects off screen 28 and is recorded by image sensor 30.

In the SAE test using a recommended 25 foot separation between a headlight and a screen, the illuminated area of interest is 87.1 inches high by 107.5 inches wide. In a preferred embodiment of the invention, a data matrix containing 31,680 data elements of light intensity and related location are stored in Static RAM 44. This number of data elements corresponds to a matrix containing 192 columns and 165 rows. If image sensor 30 contains a larger number of light sensors than the desired number of cells, the desired number of cells can be obtained by ignoring the measurements of certain light sensors or by averaging the measurements of adjacent light sensors to achieve the desired number of data elements.

Each matrix cell represents an area of about 0.42 inch in width and 0.36 inch in height. Since the image formed on the screen in the novel apparatus is smaller than the SAE pattern at 25 feet, each light intensity cell on screen 28 is actually much smaller than 0.42 inch by 0.36 inch. However, for a 192 by 165 matrix, each cell corresponds to a 0.42 inch by 0.36 inch area of the SAE standard pattern. Different matrix cell sizes can produce finer or coarser divisions of the SAE standard lamp illumination pattern.

The SAE low beam aiming standard currently specifies that two points having a fixed geometrical relationship to each other must also have a particular intensity relationship. One of the points must lie on the horizontal axis 10.5 inches to the right from the intersection of orthogonal horizontal and vertical axes and have an intensity equal to 20% of the maximum low beam intensity. The other point must lie on the vertical axis 5 inches below the intersection of the horizontal and vertical axes and have an intensity of 30% of the maximum low beam intensity. Once these points are found, the axes are "drawn". The location of the axes is compared to the horizontal and vertical axes on a vehicle, as specified by the SAE, a calculation is then made to determine the accuracy of headlamp aim. A detailed description of this aiming method is discussed in Hopkins U.S. Pat. No. 4,948,249.

Although the aiming method described above using the current SAE standards enables most headlights to be properly aimed, the technique is not appropriate for all headlight types because of the aforementioned problems of finding intensity points with certain geometric and spacial relationships. In particular, it is not always possible to find a point which lies on the horizontal axis 10.5 inches to the right from the intersection of orthogonal horizontal and vertical axes which has an intensity equal to 20% of the maximum low beam intensity; and a point on the vertical axis 5 inches below the intersection of the horizontal and vertical axes with an intensity of 30% of the maximum low beam intensity.

Accordingly, the applicants of the present invention have developed an improved method for aiming a vehicle's headlights, which is referred to as "pattern framing". In the pattern framing method, the location of horizontal and vertical axes having certain intensity relationships are determined. The locations of these axes are then compared to appropriate specifications to determine if the headlight is aimed properly.

The applicants have recognized that the light intensity pattern of a properly aimed headlight has certain characteristics in the vertical and horizontal directions along a road surface. In particular, the applicants have recognized that the horizontal axis of the light pattern corresponds to the illumination of the headlight above the road surface, and that this characteristic should be chosen such that the road is illuminated for a sufficient distance, but that vehicles travelling in the same direction in front of the driver are not blinded through the rear-view mirror, and that portions of the light beam are not "lost" by being directed above the horizon.

Further, the applicants have recognized that the vertical axis of the light pattern corresponds to the illumination of the headlight into the oncoming flow of traffic, and that this characteristic should be chosen so as not to blind the oncoming traffic. The applicants have applied these general principles to the intensity patterns of vehicle headlights and have determined that these principles allow a wide variety of commercially-available headlights to be properly aimed.

According to the pattern framing method, the location of the "hot spot" is initially determined from the points in the illumination pattern. The horizontal rows and vertical columns of points are then searched in the pattern until a horizontal row and a vertical column is found having at least one point with certain intensity relationships with respect to the "hot spot". Preferably, the points are searched until a horizontal row farthest from the hot spot is found having at least one point with a light intensity equal to 20% of the maximum light intensity; and a vertical row farthest from the hot spot is found having at least one point with a light intensity of 60% of the maximum light intensity. These values can change depending upon headlight characteristics. In any case, axes are drawn through the column and row, and the intersection is then compared with appropriate specifications to determine if the headlight is aimed properly. Since the pattern framing method is not dependent upon fixed geometric and spacial relationships, but rather on intensity levels and the relationship between the intensity levels and the road surface, the method allows a wide variety of headlight types to be properly aimed.

In a preferred embodiment of the invention, the light intensity value in each cell in the matrix is digitized. The digital signals containing light intensity are referred to as pixels. Microprocessor 56 sorts through the pixels in this and other tests, and determines the location of the pixel with the brightest intensity. In sorting through the pixels, it may be desirable to average a pixel with each of its immediately adjacent neighbors to avoid false readings. The averaging can eliminate errors that might be introduced by isolated blemishes that can reduce sensitivities of a few of the light intensity sensors in a CCD IC.

Figure 5:
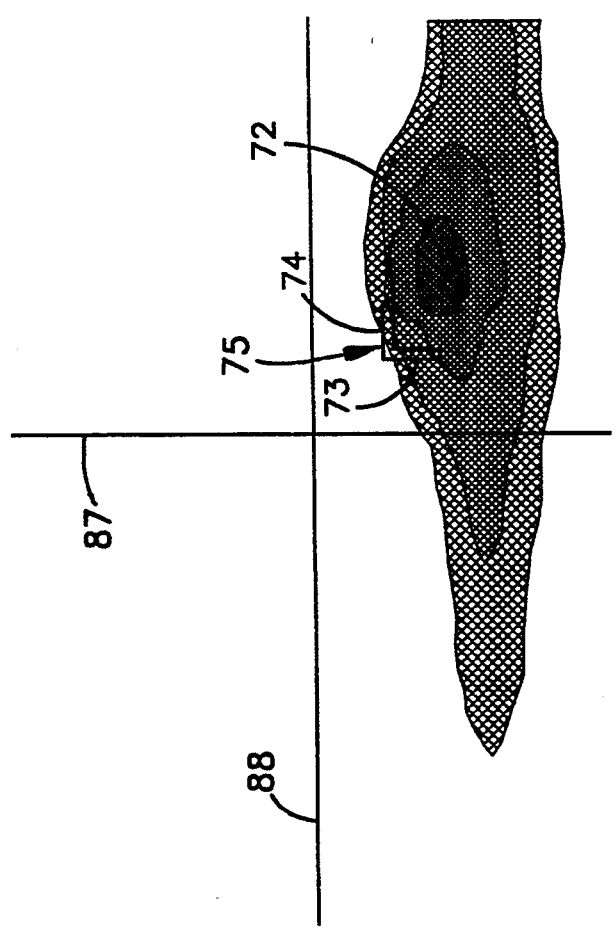
FIG. 5 is a graphical display on a printer or CRT of an intensity pattern of a vehicle headlight produced according to the invention.

Once the brightest light intensity pixel has been located, for example as indicated graphically at 72 in FIG. 5, its intensity is preferably compared to a minimum acceptable threshold. If the light intensity of the brightest pixel is below the threshold, an error message is produced so that the operator may determine whether the headlight is obstructed or defective and whether to continue the test or to replace the lamp. Assuming the minimum brightest intensity criterion is met, microprocessor 56 next calculates the 20% and 60% intensity levels. Thereafter the program determines the location of the row and column which is farthest away from the hot spot and which has at least one pixel with these particular intensity levels, and compares the found row and column with the appropriate specification for the headlamp.

In a preferred pixel-scanning routine for the pattern framing method, the software begins searching the pixel rows above the location of the row with the hot spot. The software initially shifts or jumps a predetermined amount of rows upward from the location of the row with the hot spot, or jumps to the uppermost row in the matrix (whichever is closer), and begins searching rows downward toward the row with the hot spot. The software continues until the first row is found having at least one pixel with the 20% intensity value. Alternatively, the rows can be searched beginning with the row of the hot spot and moving in an upward direction, away from the hot spot. In this case, the software continues until a row is found having at least one point with the 20% intensity value which is farthest away from the row with the hot spot. In either case, the same row should be identified.

The software then scans the vertical columns in much the same manner as described above (either toward the column having the hot spot, or away from that column), until a column is found having at least one point with the 60% intensity value. To aim a headlight for a left-hand drive vehicle (such as in the United State), the software scans the vertical columns to the right of the column with the hot spot; while for a right-hand drive vehicle (such as in the U.K.), the software scans the vertical columns to the left of the column with the hot spot. Once these relationships are satisfied, orthogonal horizontal and vertical axes are drawn through the 20% and 60% intensity row and column. The location of the intersection of these axes is calculated by microprocessor 56 at the direction of the software resident in ROM/EPROM 62.

The location of the intersection calculated from the measured light intensities is compared to the location of an appropriate mechanical intersection. The location of the mechanical intersection may be supplied to the apparatus by an operator via keyboard 21 or may be stored in the EEROM 60 for reference. Microprocessor 56 can then calculate any variance between the mechanical intersection and the intersection calculated from the measured light intensities to determine if the headlight is aimed within the degree of accuracy prescribed by the manufacturer or governmental agency. The results of the aiming accuracy calculation may be displayed on CRT 20.

If the headlight is grossly misaimed or defective during the aiming technique, it is possible that the points having the appropriate light intensity will not be located. If after an established amount of scanning of the pixels, points satisfying the criteria are not located, an error message is output by the apparatus on CRT 20. In that event, a substantial, coarse re-aiming of the headlight may be made followed by a repetition of the low beam aiming routine. Alternatively, the lamp is replaced.

However, applicants have also recognized a need to have more than one aiming method available, should one method not provide appropriate results. Accordingly, the software in the computer can be directed to scan the pixels using different methods, such as "fractional balance", or "hot spot aiming", such that proper aim of the headlight can be achieved. Appropriate commands can be displayed on CRT 20 and the keyboard 21 can be utilized to switch between the different methods, if desired.

The standards for aiming high beam lamps are different from the low beam standard, necessitating use of a different aiming program than pattern framing. As noted above, where dual beam lamps are used, only the low beam needs to be aimed. However, since separate high beam lamps are commonly used presently, a separate high beam aiming procedure should be available. In the first step of the high beam method, the high beam lamp is centered with respect to the lens of the aiming device in the manner already described for aiming a low beam lamp. Thereafter, the high beam lamp is illuminated and the pattern of light produced on screen 28 is recorded by image sensor 30.

Since high beam lights are intended for long distance illumination, the mechanical axis intersection for the vehicle and the intersection of the horizontal and vertical axes of symmetry of the light beam are essentially coincident. In order to determine the location of the intersection of the orthogonal horizontal and vertical axes of the light pattern, a symmetry test is performed using the microprocessor to analyze the pixels.

Light intensity values on the left and right sides of the pattern are evaluated to locate a vertical axis in which the best balance between the pixels on either side of the axis is obtained. Likewise, the same balancing technique is applied for the horizontal axis in the upper and lower half of the light pattern.

For example, light intensities of all of the pixels lying on one side of an arbitrary horizontal axis are compared to the light intensities of all the pixels lying on the other side of the arbitrary horizontal axis. The comparison of the pixels is continued as the position of the arbitrary horizontal axis is shifted until a perfect balance or the most nearly perfect balance obtainable is achieved. The horizontal axis is established at that balance position. The vertical axis is similarly located.

Once the horizontal and vertical axes have been determined by microprocessor 56 employing the balancing routine from the program stored in ROM/EPROM 62, the location of the intersection of the horizontal and vertical axes is calculated. This location is compared to the mechanical axis specified by the SAE to determine if the difference is within the prescribed degree of accuracy.

As with the low beam aiming method, any deviation between the mechanical and optical axes may be displayed on CRT 20. If a sufficient error exists, an electrical error signal is produced indicating the direction and degree of error. Manual adjustment of the headlight can then be performed pursuant to the indicated error. Alternatively, the error can be output through Input/Output device 71 to powered screwdrivers which engage screws 41B (FIG. 3) to adjust the headlight 15.

By use of a microprocessor and related memories of sufficient capacity, the aiming methods can be carried out quickly. Completion of the aiming calculations can be rapidly completed so that the accuracy of the aim can be determined and, if necessary, adjusted in no more than a minute in an automated apparatus. This rapid response is particularly important in vehicle manufacture and represents a substantial improvement compared to the mechanical/optical, conventional aiming devices.

Since the novel method and apparatus determines light intensity at each pixel in a matrix covering all or nearly all of the illumination pattern produced by the headlight, the invention may also be used to determine whether the pattern meets established illumination pattern standards.

For example, the SAE specifies illumination beam standards consisting of a maximum, a minimum or a range of light intensity for each of a number of locations in an illumination pattern. Different test points intersection of the orthogonal horizontal and vertical axes is determined for a lamp. It is a simple matter, using the pixel matrix, to test the specified points to determine whether the light pattern meets a particular SAE standard. As before, applying different standards would be a simple matter in the invention, merely requiring alteration of the program stored in ROM/EPROM 62.

In addition to testing the light intensity at discrete points within the illumination pattern of a headlight, the pixel matrix provides the ability to produce a graphical plot of the illumination beam. Because of the digitization of the light intensity levels, it is a relatively simple matter to determine the location of contours of uniform light intensity within the radiated pattern. These contours, referred to as isocandela lines, may be displayed in a number of ways in the invention. For example, the lines themselves can be drawn on printer 64 to produce a plot resembling a topographical map. In addition, if printer 64 has color capabilities, a false color can be assigned to each region between adjacent isocandela lines. A multiple color display can readily illustrate the light intensity pattern of a headlight. The same visual effect can be presented in black and white by controlling the intensity (or grey scale) of the display between isocandela lines on a CRT.

An example of a black and white graphical display is shown in FIG. 5 for low beam lamps. A graphical display for high beam lamps would render a similar display. The vertical and horizontal axes 73, 74, represent the 20% and 60% intensity levels which were found during the pixel search.

In the illumination pattern measurements, absolute light intensity is measured. In the aiming procedures, relative light intensities may be sufficient. In order to measure absolute intensities, the novel instrument is calibrated using a light intensity standard lamp having a known illumination pattern and light intensity. In either case, relative light intensity is sensed, with either a "floating" reference or an absolute reference derived from the calibrated standard lamp.

The graphical display of FIG. 5 can also be reproduced on CRT 20 as a visual indication of a headlight intensity pattern, for example as shown in FIG. 6. The isocandela lines can be appropriately drawn and shaded to resemble a topographical map. For example, the vertical and horizontal axes 73, 74, representing the 20% and 60% intensity levels respectively, can also be included on CRT 20. The intersection of the two axes is labeled 75.

To indicate deviations from a properly aimed headlight, a number of graphical and digital representations can be included on CRT 20. For example, an additional set of vertical and horizontal axes 76, 77, respectively, can be displayed along the right and bottom sides of the CRT screen. These axes can include indexed graduations indicating inches of deviation per 25 feet. The graphical display of the intensity pattern can be compared with the graduated axes to determine the deviation from a properly aimed headlight.

Moreover, cursors 80, 81 can be included along the sides of graduated axes 76, 77 respectively, to indicate the deviation of the measured intensity pattern from the proper intensity pattern. In particular, the moveable cursors 80, 81 are aligned and move in conjunction with horizontal and vertical axes 73, 74, respectively. For example, a vertical displacement of the 20% intensity row will move axis 74 appropriately, and will simultaneously displace cursor 80 along vertical graduated axis 76 to indicate the deviation in inches per 25 feet.

In addition to cursors 80, 81, an aiming circle 82 can be included on CRT 20 to digitally and graphically indicate deviation and direction for corrective adjustment from the properly aimed headlight. In particular, aiming circle 82 can be separated into quarters to indicate relative upwards, downwards, or left or right corrections. Finally, although not shown, the deviation can be simply digitally displayed at a point along the graduated axes—for example, the horizontal deviation can be displayed at a point (e.g., the mid-point) along the horizontal axis, while the vertical deviation can be displayed at a point (e.g., the mid-point) along the vertical axis.

Figure 7:
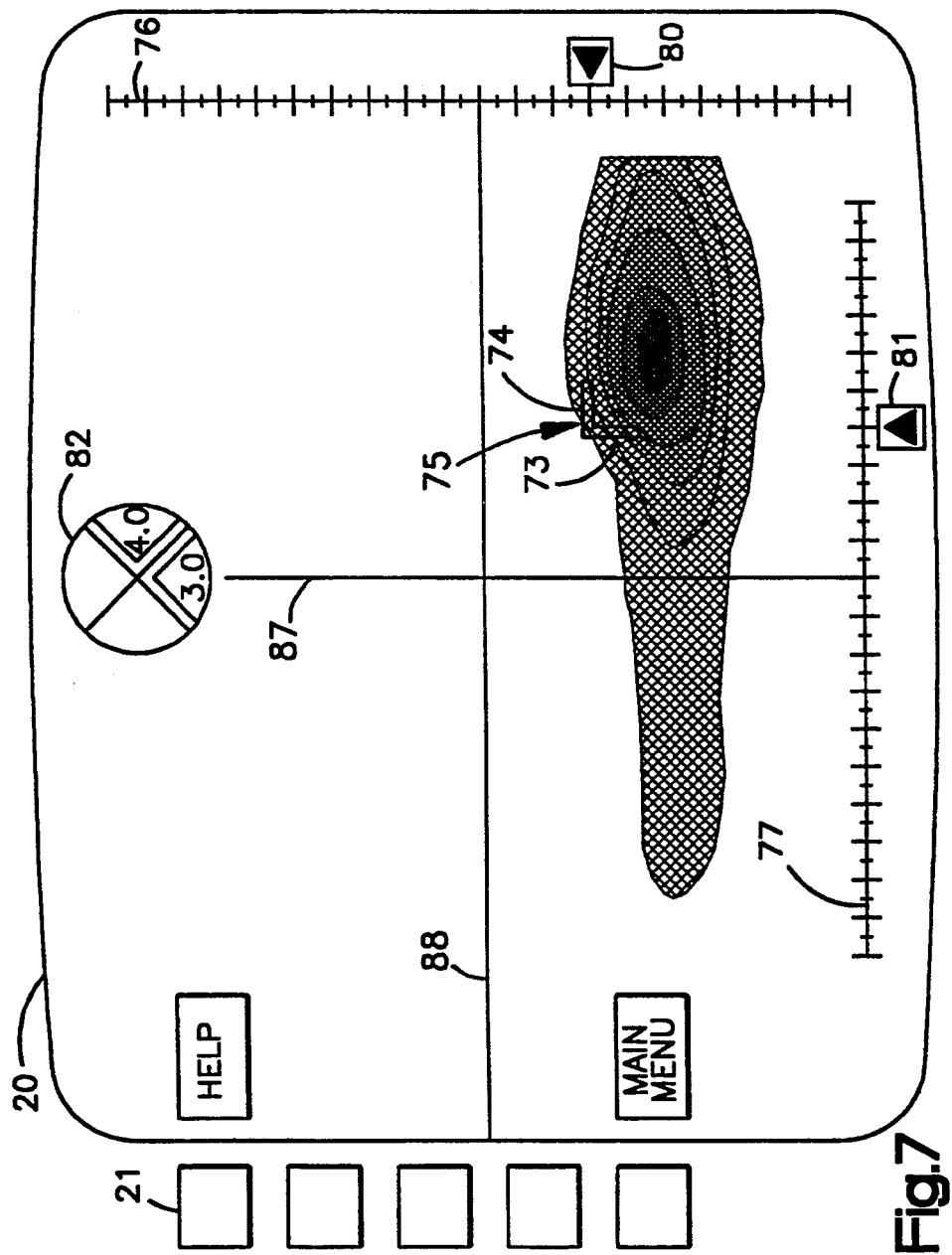
FIG. 7 is a graphical display on a CRT of an intensity pattern of a vehicle headlight, illustrating an improperly aimed vehicle headlight.

For example, as shown in FIG. 7, an improperly aimed headlight produces intensity patterns on the CRT that deviate from a properly aimed headlight. The deviation can be determined by comparing the horizontal and vertical axes 73, 74 to the graduated axes 76, 77. Moreover, the deviation can be determined by noting the movement of cursors 80, 81 along the graduated axes 76, 77. In the illustrated example, a vertical deviation of 3 inches, and a horizontal deviation of 4 inches is indicated by cursors 80, 81, respectively. Similarly, aiming circle 82 indicates a 3 inch vertical and 4 inch horizontal deviation in appropriate quarters of the circle and the direction of correction. As the vehicle headlights are adjusted, the vertical and horizontal axes 73, 74 are brought into alignment with vertical and horizontal axes 87, 88, which represent graphically the perspective line and horizon line of the road surface.

Figure 8:
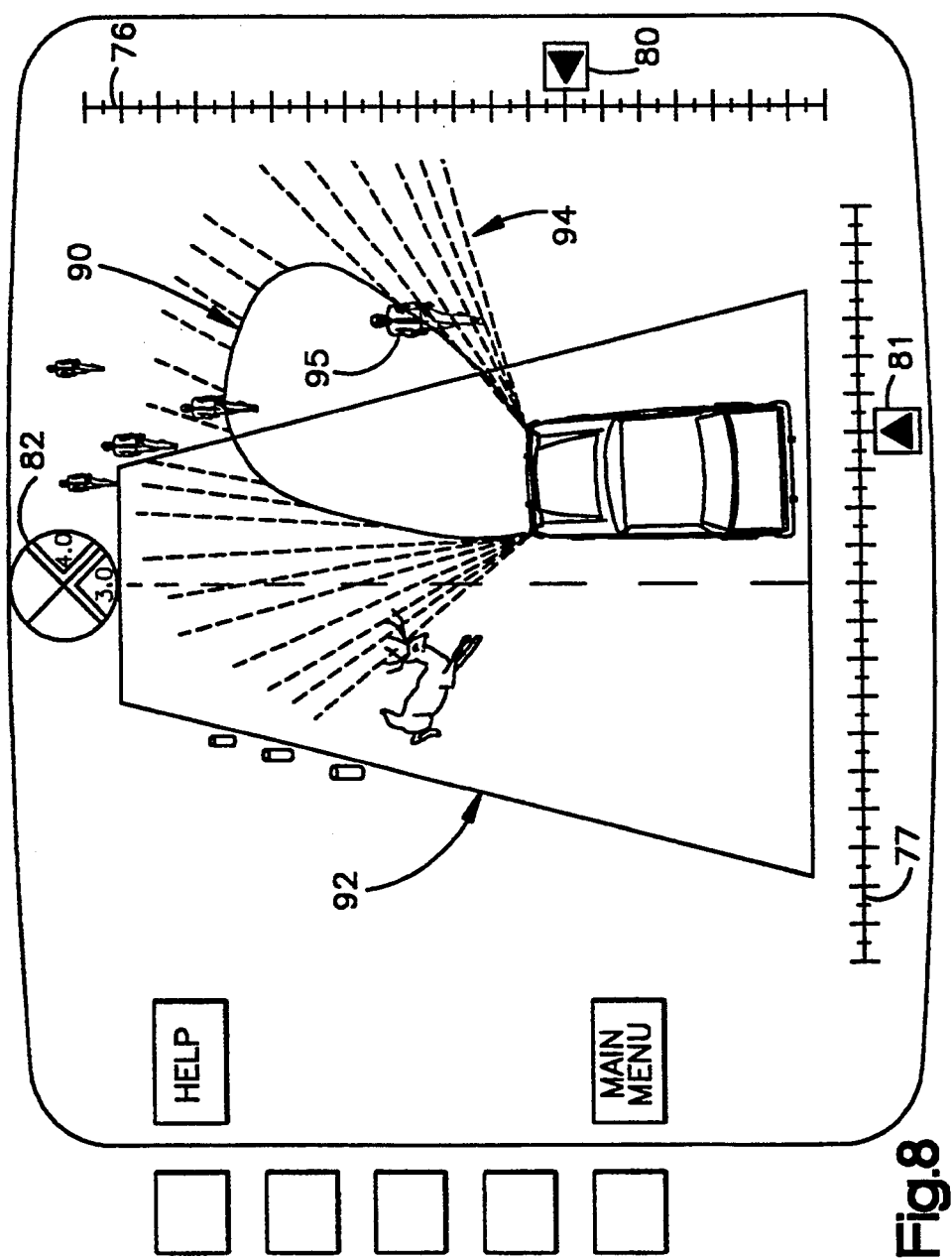
FIG. 8 is a CRT display of a simulated light beam illuminating a simulated road surface, illustrating an improperly aimed headlight.
Figure 9:
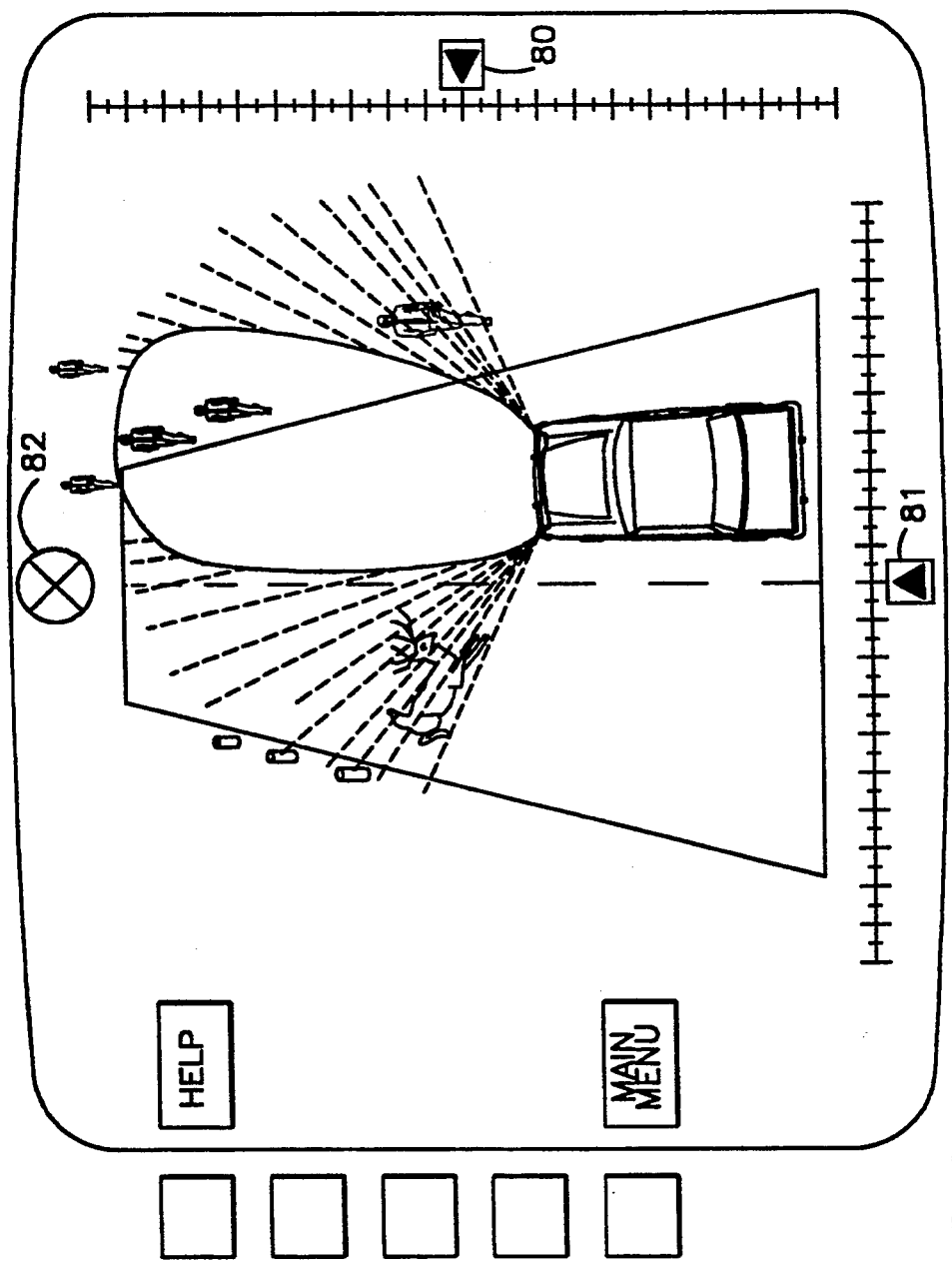
FIG. 9 is a CRT display of a simulated light beam illuminating a simulated road surface, illustrating a properly aimed vehicle headlight.

Referring now to FIGS. 8 and 9, the headlight intensity pattern can also be displayed on the CRT as a simulated headlight beam 90, indicated generally at 90. The headlight beam can be represented as emanating from a simulated vehicle 91. Moreover, the pattern can be displayed on a simulated road surface, indicated generally at 92, having exemplary objects such as deer, people, highway cones, etc. (unnumbered) simultaneously displayed thereon.

The simulated headlight beam, road surface, vehicle and exemplary objects are provided by the ROM/EPROM 62 (FIG. 4) and the microprocessor. The exemplary objects are primarily designed to indicate the relative distance and orientation of the headlight illumination pattern with respect to a typical road surface. The headlight beam 90 includes a beam print on the road surface of maximum illumination that gradually tapers into areas of reduced illumination, indicated generally at 94, as is typical of conventional headlights.

The objects are preferably indicated in black on a white background in locations where the headlight beam is aimed, such as for example as indicated at 95, and in black on a grey background in the reduced illumination area 94. In the areas where the headlight beam is not aimed, the objects are generally not visible. Additionally, the location of the objects, and in particular the highway cones, can correspond to specific distances along the road surface to further indicate the effectiveness of the headlight.

Vertical and horizontal axes 76, 77, cursors 80, 81 and aiming circle 82 can be included with the simulated headlight intensity patterns of FIGS. 8 and 9 to indicate the relative deviation from a properly aimed headlight pattern.

The visual image of the headlight pattern portrayed on CRT 20 as a simulated headlight pattern impresses upon the motorist the importance of a properly aimed headlight. The exemplary objects provide an indication of the distance and orientation of the illumination pattern on the road surface.

To provide a comparison between the measured headlight and a properly aimed headlight, ROM/EPROM 62 (FIG. 4) can selectively provide a visual display of a properly aimed headlight, as shown in FIG.

9. The selection of the respective display can be provided by actuating an appropriate key on keyboard 21. As before, cursors 80, 81 and aiming circle 82 indicate when the proper aim of the headlight has been achieved.

During the analysis of the aim of the headlight, the screws 41 (FIG. 3) on frame 40 can be adjusted at any point to re-orient the headlight. As the headlight is adjusted, cursors 80, 81 and aiming circle 82 simultaneously reflect the change in orientation. Accordingly, as the headlight is adjusted towards the proper orientation, the cursors 80, 81 approach the "0" graduation, and an "Aim OK" message can be displayed on CRT 20.

The flexibility and advantages of the invention are apparent from the foregoing description. The invention described herein provides an improved "pattern framing" method for headlight aiming which provides rapid and accurate results, regardless of the type of headlight is being tested.

Moreover, the illumination pattern of the headlight can be displayed on a video terminal as a simulated light beam, and can be selectively compared to a properly aimed, simulated light beam to indicate deviations in the headlight aiming.

The invention has been described with respect to certain embodiments. Modifications and additions within the spirit of the invention will occur to those of skill in the art. Accordingly, the scope of the invention is limited solely by the following claims.

What is claimed is:

1. A method of aiming a vehicle headlight, comprising the steps of:

projecting a light beam from a vehicle headlight onto a reflective surface, sensing the intensity of the reflected light beam in each cell in a matrix of cells overlying the reflected light beam, wherein the matrix of cells is organized in horizontal rows and vertical columns, and generating for each cell in the matrix an electrical signal indicative of the position of the cell and the intensity of the light beam in the cell, and comparing a sufficient number of electrical signals to determine the light intensity of the brightest cell in the beam, determining light intensity at the brightest cell, calculating at least two established light intensity levels relative to the intensity of the brightest cell, and scanning rows and columns of cells to determine the location of a row having at least one cell with one of said two intensity levels, and the location of a column having at least one cell with the other of said two established light intensity levels.

2. The method as in claim 1, further including the steps of:

determining the location of the intersection of two orthogonal axes passing through the found row and column, comparing the location of the intersection of the two orthogonal axes with established criteria for the intersection of orthogonal axes for a properly aimed headlight, displaying the two orthogonal axes on a display along with two reference orthogonal axes which correspond to positions on a road surface, and adjusting the vehicle headlight until the intersection of the two orthogonal axes corresponds to the intersection of the two reference orthogonal axes.

3. A method as in claim 2, wherein the cells in the matrix are scanned above and to the right of the brightest cell in the matrix for a left-hand drive vehicle headlight, and above and to the left of the brightest cell in the matrix for a right-hand drive vehicle headlight, in order to determine the location of the row and column of cells having cells with the two established light intensity levels.

4. A method as in claim 3, wherein the cells in the matrix are searched until a row is found farthest away from the row with the brightest cell having at least one cell with a light intensity value which is 20% of the light intensity value of the brightest cell, and until a column is found farthest away from the column with the brightest cell having at least one cell with a light intensity value which is 60% of the light intensity value of the brightest cell.

5. A method as in claim 3, wherein the location of the brightest intensity cell in the matrix is determined, and the rows of the matrix are then scanned by initially shifting a predetermined number of rows away from the row containing the brightest intensity cell and scanning the rows in a direction toward the row containing the brightest intensity cell until the first row is found having at least one cell with the one of the two established light intensity values, and the columns of the matrix are scanned by initially shifting a predetermined number of columns away from the column containing the brightest intensity cell and scanning the columns in a direction toward the column containing the brightest intensity cell until the first column is found having at least one cell with the second of the two light intensity values.

6. A method as in claim 5, further including cursors moveable with respect to the vertical and horizontal axes to indicate the relative deviation of the vehicle headlight light beam and the properly aimed headlight light beam.

7. A method as in claim 3, wherein the location of the brightest intensity cell in the matrix is determined, and the rows of the matrix are then scanned by scanning the rows in a direction away from the row containing the brightest intensity cell until the row is found having at least one cell with the one of the two established light intensity values which is farthest away from the row containing the brightest intensity value, and the columns of the matrix are scanned by scanning the columns in a direction away from the column containing the brightest intensity cell until the column is found having at least one cell with the second of the two light intensity values which is farthest away from the column containing the brightest intensity value.

8. A method as in claim 1, further including the steps of displaying graduated axes to indicate the relative deviation of the vehicle headlight light beam and a properly aimed headlight light beam, one of said axes extending vertically with respect to the headlight light beams and another of said axes extending horizontally with respect to the headlight light beams.

9. The method as in claim 8, further including the steps of:

determining the location of the intersection of the two orthogonal axes passing through the found row and column with the established light intensity level, comparing the location of the intersection of the two orthogonal axes with established criteria for the intersection of orthogonal axes for a properly aimed headlight, displaying the two orthogonal axes on a display along with two reference orthogonal axes which correspond to positions on a road surface, and adjusting the vehicle headlight until the intersection of the two orthogonal axes corresponds to the intersection of the two orthogonal axes for the properly aimed headlight.

10. A method as in claim 9, wherein the cells in the matrix are scanned above and to the right of the brightest cell in the matrix for a left-hand drive vehicle headlight, and above and to the left of the brightest cell in the matrix for a right-hand drive vehicle headlight, in order to determine the location of the row and column of cells having cells with the two established light intensity levels.

11. A method as in claim 10, wherein the cells in the matrix are searched until a row is found farthest away from the row with the brightest cell having at least one cell with a light intensity value which is 20% of the light intensity value of the brightest cell, and until a column is found farthest away from the column with the brightest cell having at least one cell with a light intensity value which is 60% of the light intensity value of the brightest cell.

12. A method as in claim 10, wherein the location of the brightest intensity cell in the matrix is determined, and the rows of the matrix are then scanned by initially shifting a predetermined number of rows away from the row containing the brightest intensity cell and scanning the rows in a direction toward the row containing the brightest intensity cell until the first row is found having at least one cell with the one of the two established light intensity values, and the columns of the matrix are scanned by initially shifting a predetermined number of columns away from the column containing the brightest intensity cell and scanning the columns in a direction toward the column containing the brightest intensity cell until the first column is found having at least one cell with the second of the two light intensity values.

13. A method as in claim 9, wherein the location of the brightest intensity cell in the matrix is determined, and the rows of the matrix are then scanned by scanning the rows in a direction away from the row containing the brightest intensity cell until the row is found having at least one cell with the one of the two established light intensity values which is farthest away from the row containing the brightest intensity value, and the columns of the matrix are scanned by scanning the columns in a direction away from the column containing the brightest intensity cell until the column is found having at least one cell with the second of the two light intensity values which is farthest away from the column containing the brightest intensity value.

14. The method as in claim 1, further including the step of centering the headlight relative to the reflective surface with a centering device.

15. A method of aiming a vehicle headlight, comprising the steps of:

projecting a light beam from a vehicle headlight onto a reflective surface, sensing the intensity of the projected light beam in each cell in a matrix of cells overlying the reflected light beam and generating for each cell an electrical signal indicative of the position of the cell and the intensity of the light beam in the cell, comparing a sufficient number of electrical signals to determine the light intensity of the brightest cell in the beam, determining light intensity at the brightest cell, calculating at least two established light intensity levels relative to the intensity of the brightest cell, and scanning rows and columns of cells to determine the location of a row having at least one cell with one of said two intensity levels which is farthest away from the row with the brightest cell, and the location of a column having at least one cell with the other of said two light intensity levels which is farthest away from the column with the brightest cell, and displaying at least some of the electrical signals as a simulated light beam to visually describe the light intensity pattern of the vehicle headlight on a simulated road surface.

16. A method of aiming a vehicle headlight, comprising the steps of:

projecting a light beam from a vehicle headlight onto a reflective surface, sensing the intensity of the projected light beam in each cell in a matrix of cells overlying the reflected light beam and generating for each cell an electrical signal indicative of the position of the cell and the intensity of the light beam in the cell, comparing a sufficient number of electrical signals to determine the light intensity of the brightest cell in the beam, determining light intensity at the brightest cell, calculating at least two established light intensity levels relative to the intensity of the brightest cell, and scanning rows and columns of cells to determine the location of a row having at least one cell with one of said two intensity levels which is farthest away from the row with the brightest cell, and the location of a column having at least one cell with the other of said two established light intensity level which is farthest away from the column with the brightest cell, and displaying at least some of the electrical signals on a display to describe the light intensity pattern of the headlight, and adjusting the aim of the headlight in accordance with the selected aiming criteria, and concurrently displaying the adjusted vehicle headlight intensity pattern on the display.

17. A method of aiming a vehicle headlight, comprising the steps of:

projecting a light beam from a vehicle headlight onto a surface, sensing the intensity of the light beam in each cell in a matrix of cells overlying the light beam, wherein the matrix of cells is organized in horizontal rows and vertical columns, and generating for each cell in the matrix an electrical signal indicative of the position of the cell and the intensity of the light beam in the cell, comparing a sufficient number of electrical signals to determine the light intensity of the brightest cell in the beam, determining light intensity at the brightest cell, calculating two established light intensity levels relative to the intensity of the brightest cell, scanning rows and columns of cells to determine the location of a row which is farthest away from the row with the brightest cell which has at least one cell with one of said two intensity levels, and the location of a column which is farthest away from the column of the brightest cell having at least one cell with the other of said two established light intensity levels, determining the location of the intersection of two orthogonal axes passing through the found row and column, comparing the location of the intersection of the two orthogonal axes with established criteria for the intersection of orthogonal axes for a properly aimed headlight, displaying the two orthogonal axes on a display along with two reference orthogonal axes which correspond to positions on a road surface, and adjusting the vehicle headlight until the intersection of the two orthogonal axes corresponds to the intersection of the two reference orthogonal axes.

* * * * *